US012654116B2

(12) United States Patent
Wang

(10) Patent No.: US 12,654,116 B2
(45) Date of Patent: Jun. 16, 2026

(54) COMPOSITE FILTER BODY

(71) Applicant: Guangli Wang, Handan (CN)

(72) Inventor: Guangli Wang, Handan (CN)

( * ) Notice: Subject to any disclaimer, the term of this patent is extended or adjusted under 35 U.S.C. 154(b) by 0 days.

(21) Appl. No.: 19/333,495

(22) Filed: Sep. 19, 2025

(65) Prior Publication Data

US 2026/0014498 A1     Jan. 15, 2026

(51) Int. Cl.
*B01D 29/56*          (2006.01)

(52) U.S. Cl.
CPC ........ *B01D 29/56* (2013.01); *B01D 2239/065* (2013.01); *B01D 2239/0654* (2013.01); *B01D 2239/0668* (2013.01)

(58) Field of Classification Search
CPC .............. B01D 29/56; B01D 2239/065; B01D 2239/0654; B01D 2239/0668
See application file for complete search history.

(56) References Cited

U.S. PATENT DOCUMENTS

2002/0170434 A1* 11/2002 Kawano ............. B01D 46/0001
55/486

FOREIGN PATENT DOCUMENTS

CN          117261394 A  *  12/2023  ............. B32B 5/022
JP          2019166515 A  *  10/2019
WO     WO-2021177690 A1 *  9/2021   ......... B01D 39/1623

OTHER PUBLICATIONS

Li, Chang-wen et al—CN 117261394 A machine translation—Dec. 22, 2023 (Year: 2023).*
Kikuchi, Yui—JP 2019-166515 A machine translation—Oct. 3, 2019 (Year: 2019).*
Noh, Eun Sil et al—WO 2021/177690 A1 machine translation—Sep. 10, 2021 (Year: 2021).*

* cited by examiner

*Primary Examiner* — Bradley R Spies
(74) *Attorney, Agent, or Firm* — Nicholas Makridakis

(57)          ABSTRACT

A composite filter body, comprising: a front filter layer, the front filter layer being a structure made of bamboo fiber material, and the front filter layer being used for pre-filtering air; and a main filter layer is stacked with the front filter layer, the main filter layer is communicated with the front filter layer, the main filter layer is one or a combination of a glass fiber layer, a polyester fiber layer, an activated carbon layer, a melt-blown non-woven fabric layer, and an antibacterial coating.

3 Claims, 8 Drawing Sheets

121
122
123
124
125
12

1

COMPOSITE FILTER BODY

TECHNICAL FIELD

The present application relates to the technical field of air filtration, and in particular to a composite filter body.

BACKGROUND

Air filters are widely applied to key components in the fields of industrial, household, medical and automobile, and play an important role in air purification, environmental quality control and pollution protection.

At present, a mainstream filter in an air filter is generally made of any single material of glass fiber, polyester fiber and activated carbon, and has the technical problem of low filtration efficiency.

SUMMARY

The present application provides a composite filter body, so as to solve the problems existing in the related art.

The technical solution is as follows:

According to a first aspect, the present application provides a composite filter body, comprising:

a front filter layer, the front filter layer being a structure made of bamboo fiber material, and the front filter layer being used for pre-filtering air; and a main filter layer, wherein the main filter layer and the front filter layer are stacked, the main filter layer is communicated with the front filter layer, the main filter layer is one or a combination of multiple layers selected from a glass fiber layer, a polyester fiber layer, an activated carbon layer, a melt-blown non-woven fabric layer, and an antibacterial coating; and the main filter layer is used for performing fine filtration treatment on air treated by the pre-filter layer.

The composite filter body further comprises:

a rear filter layer, the rear filter layer, the main filter layer, and the front filter layer are sequentially stacked in a thickness direction of the composite filter body, the rear filter layer is communicated with the main filter layer, the rear filter layer is a structure made of bamboo fiber material, and the rear filter layer is used for post-filtering the air processed by the main filter layer.

A cross-sectional shape of the composite filter body is rectangular.

A cross-sectional shape of the composite filter body is a continuous folding wave shape.

A cross-sectional shape of the composite filter body is a continuous folding zigzag shape.

The composite filter body is cylindrical.

According to a second aspect, this application provides a filter element, including the foregoing composite filter body.

According to a third aspect, this application provides an air filter apparatus, including the foregoing composite filter body.

Advantages or beneficial effects in the above technical solution at least comprises:

The composite laminated structure of the front filter layer and the main filter layer of the bamboo fiber solves the problem of low filtration efficiency of a traditional single material, and specifically shows that the pre-filter layer of the bamboo fiber preferentially intercepts the large particle pollutants by virtue of its natural porous network structure, achieves coarse-effect filtration and reduces the load of the main filter layer; the main filter layer performs, by means of a synergistic effect of single or multiple mechanisms such as micron-scale fiber interleaving, activated carbon adsorption, and melt-spraying cloth electrostatic electret, the fine particles such as PM2.5 in the pre-filtered air are subjected to deep retention, and the two (the bamboo fiber pre-filter layer and the main filter layer) cooperate with each other by means of a level of decreasing pore diameter gradient, so that the air pollutants sequentially undergo a step-type purification process of coarse filtration-fine filtration, and finally the filtration efficiency is improved.

In addition, a natural longitudinal tubular pore structure is provided inside the bamboo fiber, the surface of the fiber is distributed with irregular micron-sized grooves and holes, and the multi-stage pore size distribution enables a multi-channel shunting effect to be formed when air flows, thereby preventing the local pressure drop from being increased by means of a single path in the airflow set; at the same time, the rigidity of the bamboo fiber is moderate, the fiber naturally forms a three-dimensional mesh structure during processing, and the filter network is constructed by means of physical lapping instead of tightly entanglement, such an open architecture not only ensures the effective interception of large particle pollutants, but also avoids the rigid barrier of the traditional dense filter material on the airflow; the hemicellulose components on the surface of the bamboo fiber have natural hydrophilicity, which can reduce the adhesion and accumulation of particulate matter on the surface of the fiber, prevent the dynamic wind resistance caused by particulate blockage during the filtering process, and synthesize the foregoing structural characteristics, so that the pre-filter layer of the bamboo fiber maintains a low and stable airflow resistance while achieving coarse-effect filtering, that is, the dual effect of improving filtration efficiency and wind resistance optimization can be achieved.

Furthermore, the bamboo fiber material itself has natural antibacterial and anti-mite properties, and in combination with the main filter layer, the antibacterial and mildew-proof ability of the composite filter body can be enhanced, and the service life is prolonged. The foregoing summary is for the purpose of illustration only and is not intended to be limiting in any way.

In addition to the illustrative aspects, embodiments, and features described above, further aspects, embodiments, and features of the present application will be readily apparent by reference to the drawings and the following detailed description.

BRIEF DESCRIPTION OF THE DRAWINGS

In the drawings, like reference numerals designate identical or similar parts or elements throughout the several figures unless otherwise specified. The drawings are not necessarily to scale.

It should be understood that these drawings depict only some embodiments according to the present disclosure and should not be regarded as limiting the scope of the present disclosure.

3

Figure 5:
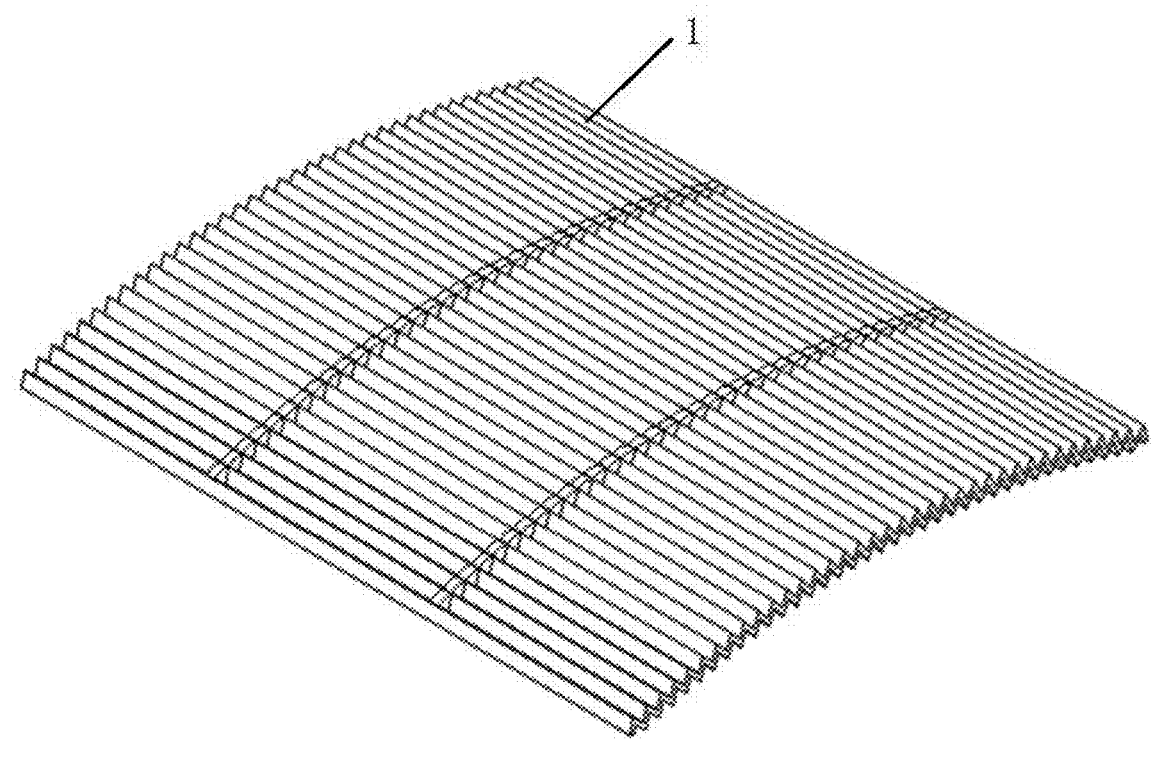
Figure 6:
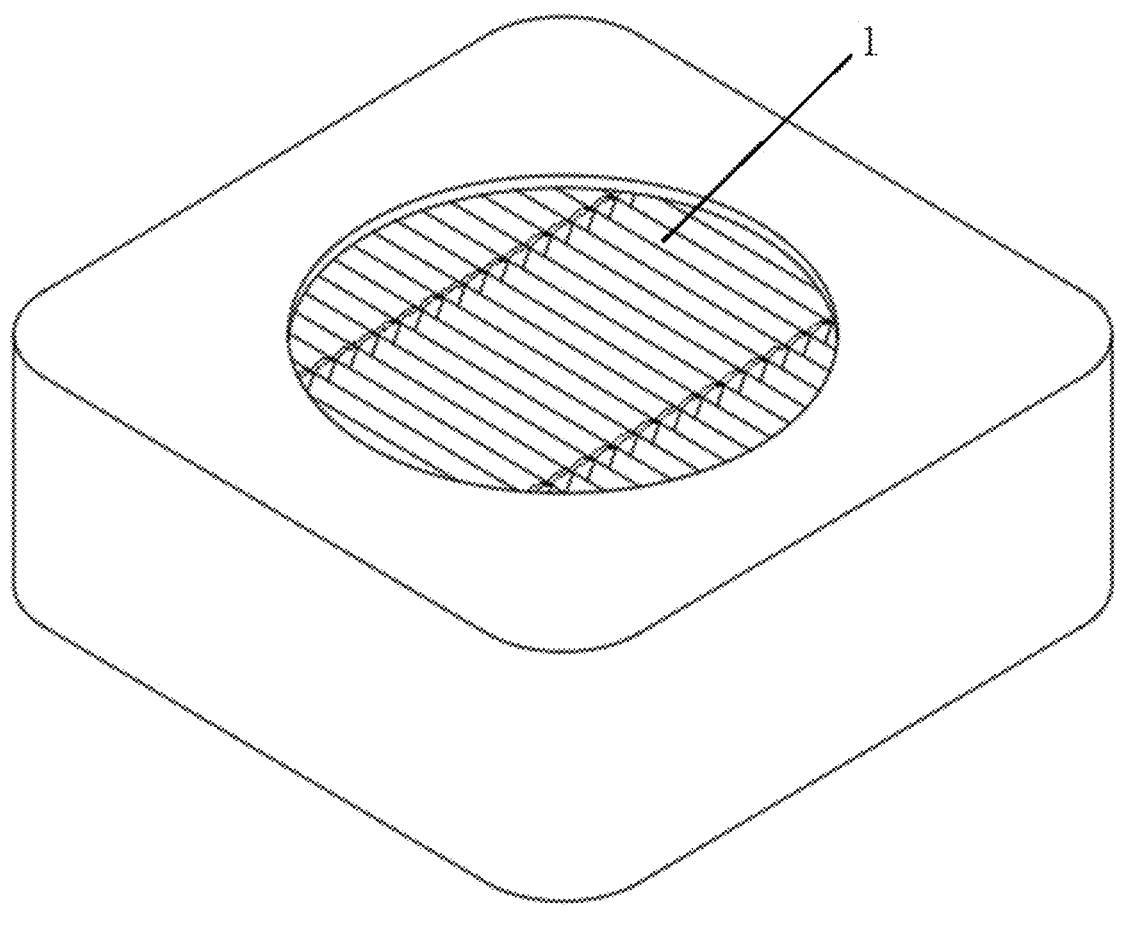
Figure 7:
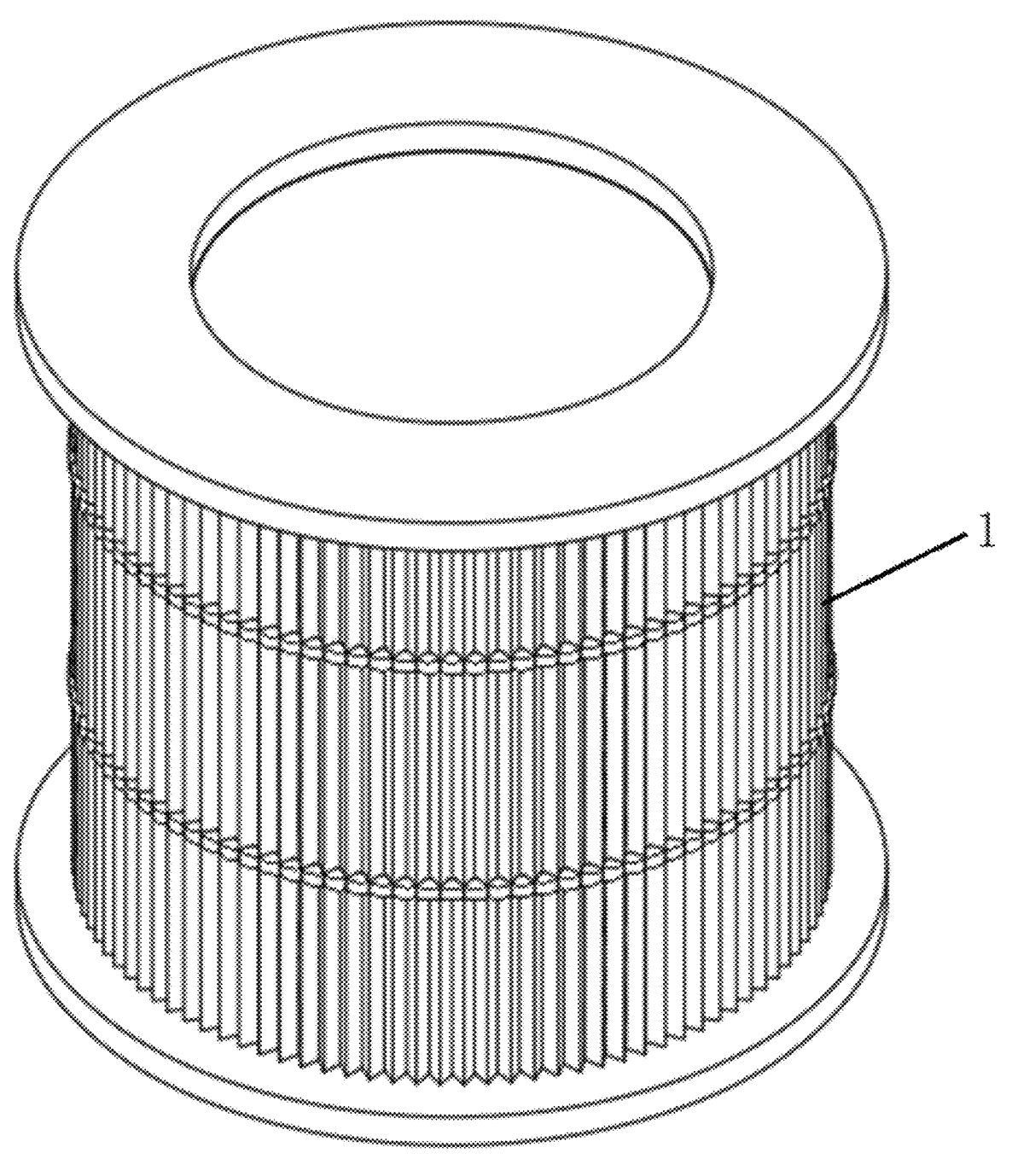
Figure 8:
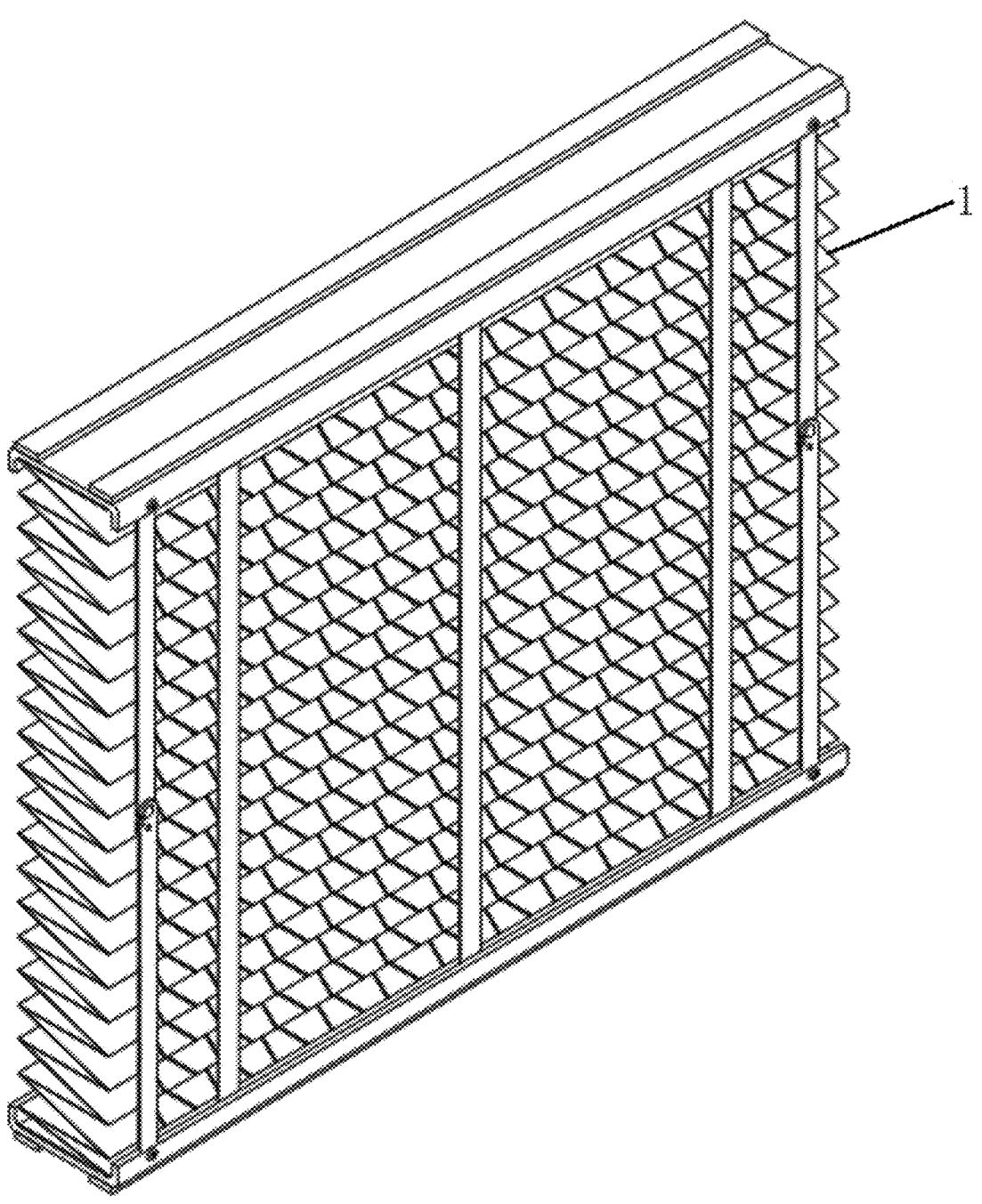
Figure 9:
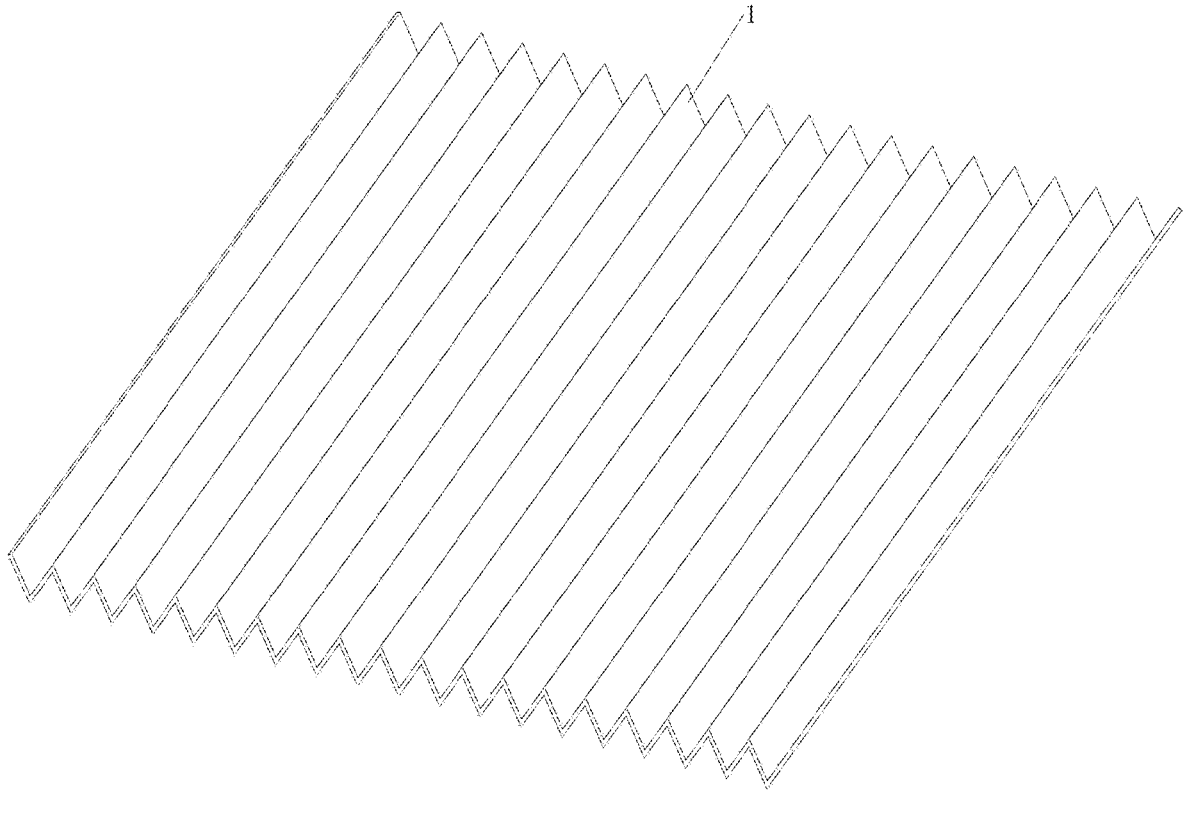

FIG. 5 is a perspective view of a filter cartridge according to a second embodiment of the present disclosure;

FIG. 6 is a perspective view of a filter cartridge according to a third embodiment of the present disclosure;

FIG. 7 is a perspective view of a filter cartridge according to a fourth embodiment of the present disclosure;

FIG. 8 is a perspective view of a filter cartridge according to a fifth embodiment of the present disclosure;

FIG. 9 is a perspective view of a filter cartridge according to a sixth embodiment of the present disclosure.

REFERENCE SIGNS

1, composite filter body; 11, front filter layer; 12, main filter layer; 121, glass fiber layer; 122, polyester fiber layer; 123, activated carbon layer; 124, melt-blown non-woven fabric layer; 125, antibacterial coating; 13, rear filter layer; 14, PET support layer.

DETAILED DESCRIPTION OF THE EMBODIMENTS

In the following, only certain exemplary embodiments are simply described. As those skilled in the art will recognize, the described embodiments may be modified in various different ways without departing from the spirit or scope of the present application. Accordingly, the drawings and description are to be regarded as illustrative in nature and not restrictive.

Figure 1:
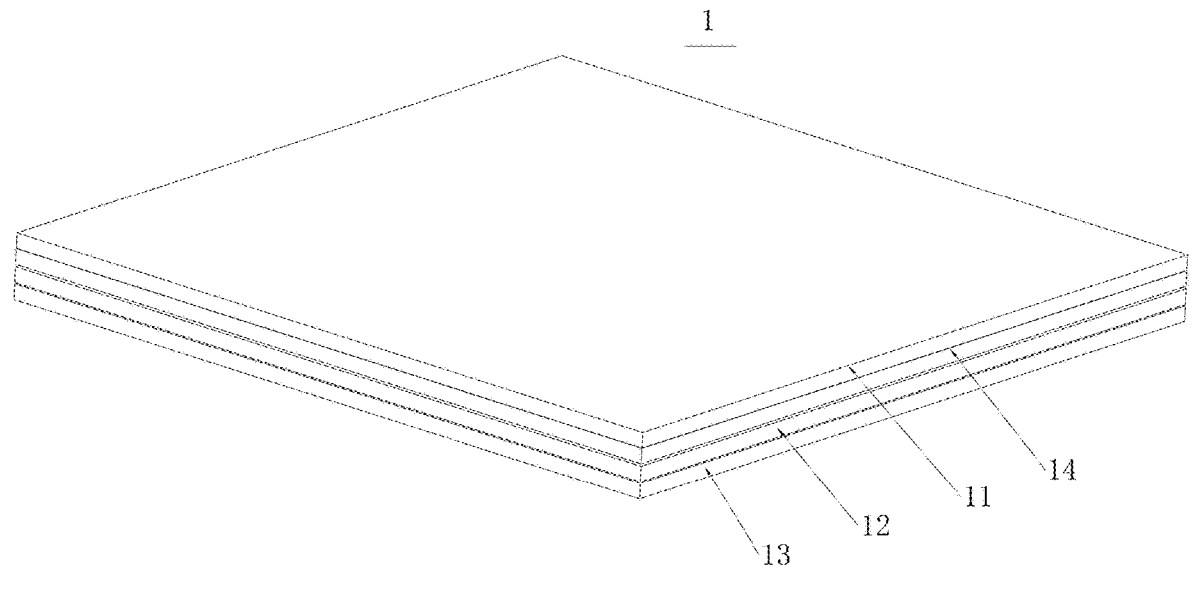
FIG. 1 is a three-dimensional structural schematic diagram of a composite filter body according to the present disclosure.
Figure 2:
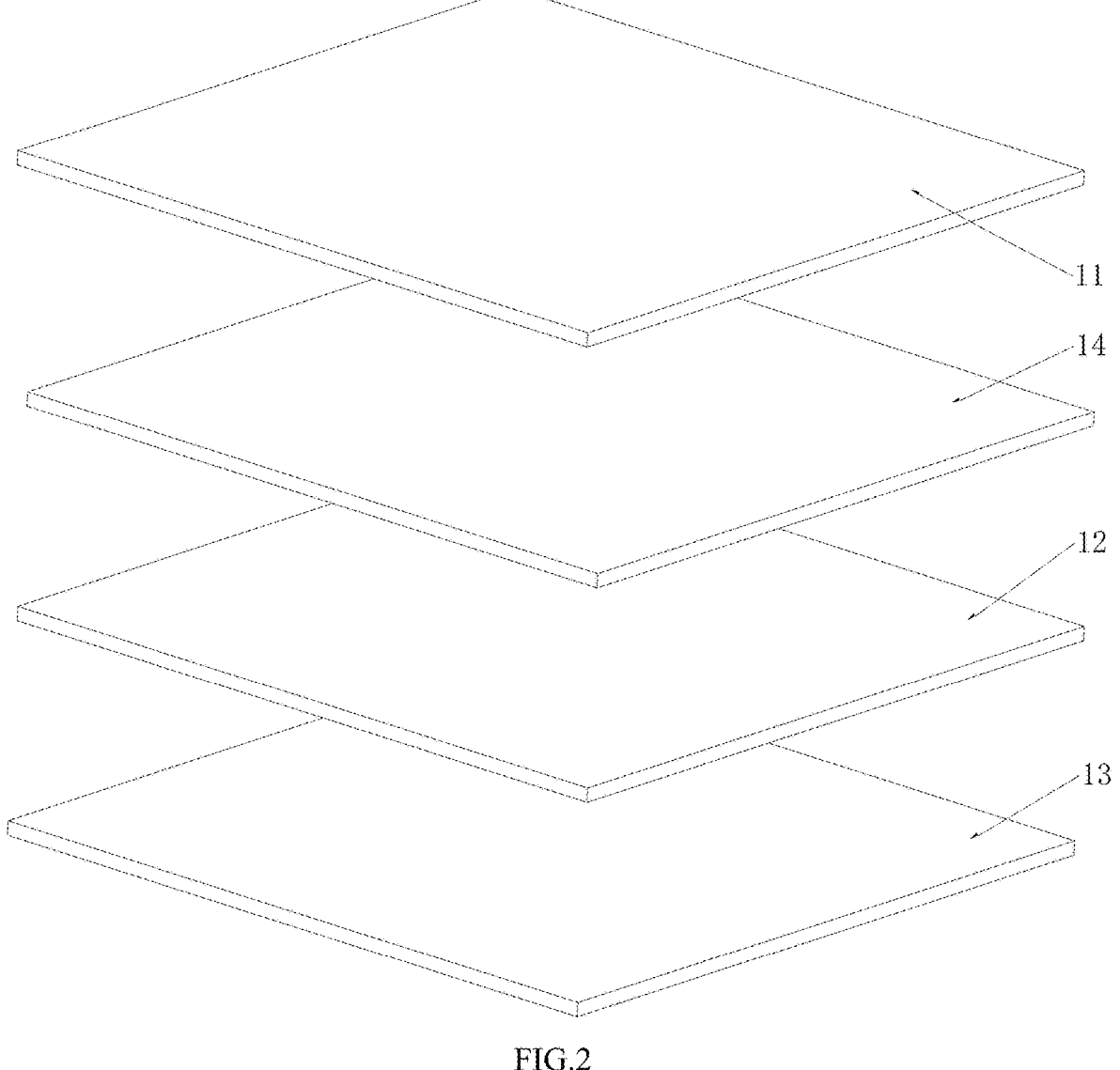
FIG. 2 is an exploded view of the composite filter body of the present disclosure.
Figure 3:
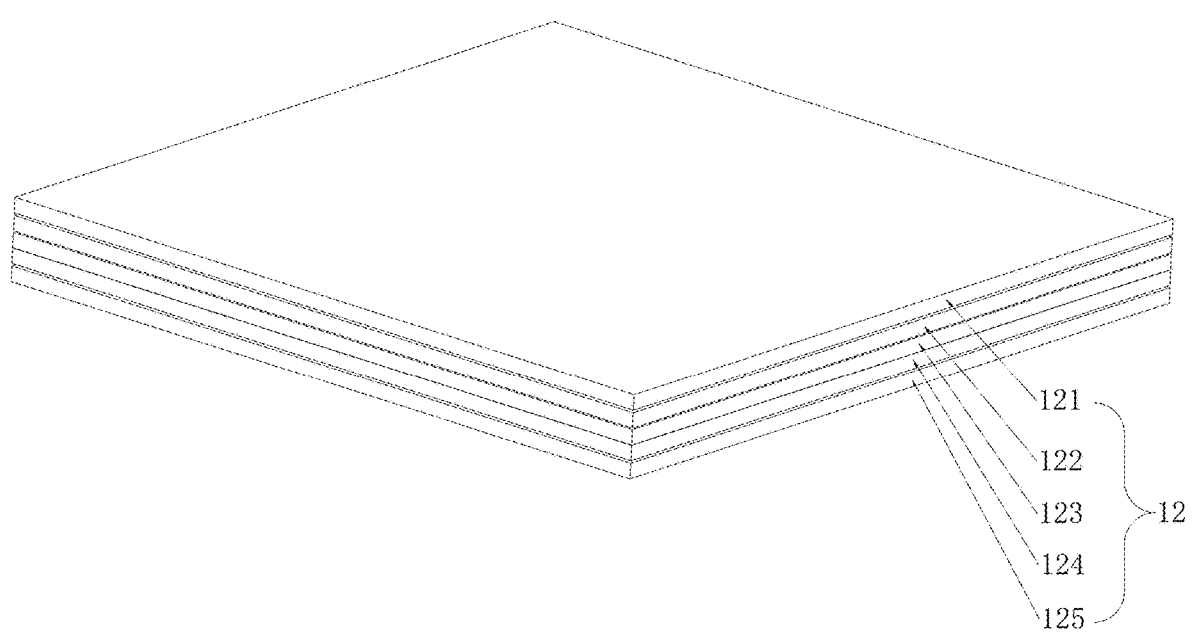
FIG. 3 is a three-dimensional schematic structural diagram of a main filter layer in a composite filter body according to the present disclosure.
Figure 4:
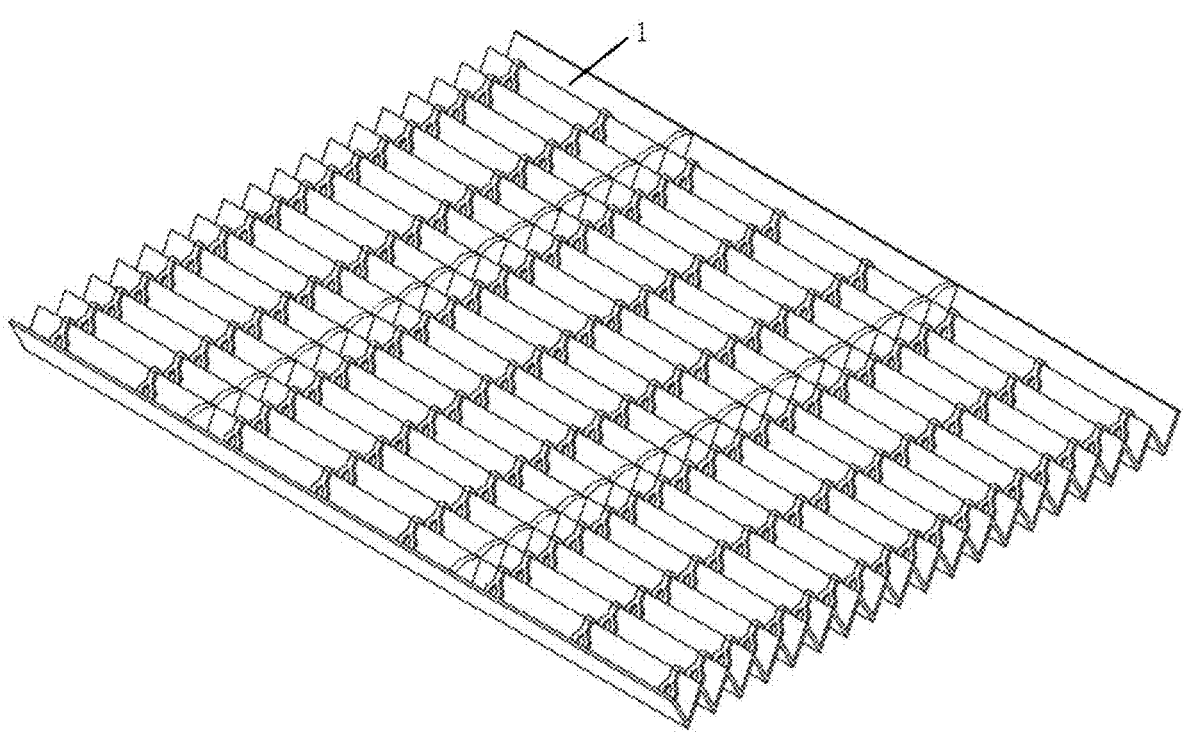
FIG. 4 is a perspective view of a filter cartridge according to a first embodiment of the present disclosure.

Referring to FIG. 1 to FIG. 3, a composite filter body 1 according to a preferred embodiment of the present disclosure is shown:

a front filter layer 11, the front filter layer 11 being a structure made of bamboo fiber material, and the front filter layer 11 being used for pre-filtering air; and a main filtering layer 12 is stacked with the front filtering layer 11. The main filtering layer 12 is in communication with the pre-filtering layer 11. The main filtering layer 12 is one or a combination of a glass fiber layer 121, a polyester fiber layer 122, an activated carbon layer 123, a melt-blown non-woven fabric layer 124, and an antibacterial coating 125.

By means of the composite laminated structure of the bamboo fiber pre-filter layer 11 and the main filter layer 12, the problem of low filtration efficiency of a traditional single material is solved; specifically, the bamboo fiber pre-filter layer 11 preferentially intercepts large particle pollutants by means of the natural porous network structure thereof, achieving coarse-effect filtering and reducing the load of the main filter layer 12; The main filter layer 12 performs, by means of a synergistic effect of single or multiple mechanisms such as micron-scale fiber interleaving, activated carbon adsorption, melt-blown cloth electrostatic electret, etc. fine particles such as PM2.5 in the pre-filtered air are subjected to deep retention, and the two (the bamboo fiber pre-filter layer 11 and the main filter layer 12) cooperate at a decreasing level by means of an aperture gradient, so that the air pollutants sequentially undergo a step-type purification process of coarse filtration-fine filtration, and finally the filtration efficiency is improved.

In addition, a natural longitudinal tubular pore structure is provided inside the bamboo fiber, the surface of the fiber is distributed with irregular micron-sized grooves and holes, and the multi-stage pore size distribution enables a multi-channel shunting effect to be formed when air flows, thereby preventing the local pressure drop from being increased by means of a single path in the airflow set; at the same time, the rigidity of the bamboo fiber is moderate, the fiber naturally forms a three-dimensional mesh structure during processing, and the filter network is constructed by means of physical lapping instead of tightly entanglement, such an open architecture not only ensures the effective interception of large particle pollutants, but also avoids the rigid barrier of the traditional dense filter material on the airflow.

In addition, the hemicellulose components on the surface of the bamboo fiber have natural hydrophilicity, which can reduce the adhesion and accumulation of particulate matter on the surface of the fiber, prevent the dynamic wind resistance caused by particulate blockage during the filtering process, and synthesize the above structural characteristics, so that the pre-filter layer 11 of the bamboo fiber maintains a low and stable airflow resistance while achieving coarse-effect filtering, that is, the dual effect of improving filtration efficiency and wind resistance optimization can be achieved.

In addition, the bamboo fiber material itself has natural antibacterial and anti-mite properties. In combination with the main filter layer 12, the antibacterial and mildew-proof ability of the composite filter body 1 can be enhanced, and the service life of the composite filter body 1 can be prolonged.

It should be noted that the glass fiber layer 121 forms a physical interception barrier by means of a dense staggered structure of micron-sized fibers, and can effectively capture suspended particles; the polyester fiber layer 122 constructs a three-dimensional filter network by means of the flexible nature of the fibers to achieve gradient retention of the particulate matter; the activated carbon layer 123 uses its developed porous surface structure to adsorb gas phase pollutants and odor molecules; the melt-blown non-woven fabric layer 124 enhances the trapping capacity of submicron particles by means of the electrostatic effect generated by the electret; the antibacterial coating 125 disrupts bacterial propagation by means of the active ingredient destroying microbial cell structure, and when the main filter layer 12 is formed by stacking a glass fiber layer 121, a polyester fiber layer 122, an activated carbon layer 123, a melt-blown non-woven fabric layer 124, and an antibacterial coating 125, each functional filter layer forms a comprehensive purification system from coarse filtration to fine filtration and physical interception to chemical treatment by means of a synergistic effect, so that the composite filter body 1 has multiple functions of particulate matter filtration, gas phase pollutant adsorption and microbial inhibition.

It should be noted that adjacent layers in the main filter layer 12 are also stacked in the thickness direction of the composite filter body 1.

It can be understood that the bamboo fiber can be processed into a non-woven fabric by using chopped bamboo pulp fibers, refined bamboo fibers, and a needle punching/wet molding process.

It can be understood that the antibacterial coating 125 May specifically be made of any one of silver ions, chitosan, natural tea polyphenols, and the like.

Referring to FIG. 1 to FIG. 2, in an embodiment, the composite filter body 1 further includes:

the rear filter layer 13, the rear filter layer 13, the main filter layer 12 and the front filter layer 11 are sequentially stacked in the thickness direction of the composite filter body 1, the rear filter layer 13 is in communication with the main filter layer 12, the rear filter layer 13 is a structure made of bamboo fiber material, and the rear filter layer 13 is used for post-filtering the air processed by the main filter layer 12. A bamboo fiber rear filter layer 13 is added to the composite filter body 1, and is sequentially laminated with the main filter layer 12 and the front filter layer 11 in a thickness direction to form a three-stage gradient filtration system, wherein the rear filter layer 13 uses the natural porous structure of bamboo fibers to perform terminal purification on the air treated by the main filter layer 12, and the three-dimensional mesh fiber architecture thereof can both complement fine particles escaping from the main filter layer 12, and balance the airflow resistance by means of loose pore distribution between fibers, and at the same time, the antibacterial properties of the bamboo fibers form a microbial inhibition barrier at the final air outlet, and the double antibacterial protection should be formed end-to-end in combination with the bamboo fiber pre-filter layer 11, so that the overall composite filter body 1 achieves linear lifting of filtration efficiency while maintaining low wind resistance characteristics, and prolongs the service life of the composite filter body 1 by means of reasonable distribution of inter-level pollutant interception loads.

In one embodiment, the composite filter body 1 further comprises:

a PET support layer 14, the PET support layer 14 being provided between the front filter layer 11 and the main filter layer 12, and the PET support layer 14 being in communication with the front filter layer 11 and the main filter layer 12; alternatively, a PET support layer 14 is provided between the main filter layer 12 and the rear filter layer 13, and the PET support layer 14 is in communication with the main filter layer 12 and the rear filter layer 13.

By providing the PET support layer 14 between the front filter layer 11 and the main filter layer 12 or between the main filter layer 12 and the rear filter layer 13 of the composite filter body 1, a stable physical support is provided for the composite filter body 1 by using the high strength and high rigidity characteristics of the PET material, so as to prevent structural deformation or interlayer displacement of each function filter layer under the impact of the airflow.

In addition, the grid-shaped opening structure specific to the PET support layer 14 can not only maintain the air flow channel clear so as to control the overall wind resistance, but can also guide the airflow to uniformly pass through the function filter layers by means of the precisely designed pore size distribution, thereby avoiding the decrease of the filtration efficiency caused by short circuit of the local air flow, thereby optimizing the overall performance of the multilayer composite filter structure while ensuring the overall structural stability of the composite filter body 1.

In one embodiment, the composite filter body 1 further comprises:

a first inter-layer connection structure, the first interlayer connection structure being arranged between the front filter layer 11 and the main filter layer 12, and the first interlayer connection structure being used for fixing the front filter layer 11 and the main filter layer 12 together;

a second interlayer connection structure, the second interlayer connection structure being arranged between the rear filter layer 13 and the main filter layer 12, and the second interlayer connection structure being used for fixing the rear filter layer 13 and the main filter layer 12 together.

In this way, by providing the first inter-layer connection structure between the front filter layer 11 and the main filter layer 12 of the composite filter body 1, a second inter-layer connection structure is provided between the main filter layer 12 and the rear filter layer 13, so that each functional filter layer forms a stable layer and is fixedly connected, thereby effectively preventing the composite filter body 1 from separation or dislocation between layers caused by airflow impact or mechanical vibration during use, ensuring that the multi-layer functional filter layer always maintains a designed relative positional relationship and filter gradient, and the arrangement of the first inter-layer connection structure and the second inter-layer connection structure not only ensures the close contact between the functional filter layers to achieve the optimal filtering path for step-by-step interception, but also avoids the degradation of the filtration efficiency caused by interlayer displacement, thereby significantly improving the structural reliability and long-term use stability of the composite filter body 1.

In one embodiment, in the case that the main filter layer 12 is a plurality of combinations of a glass fiber layer 121, a polyester fiber layer 122, an activated carbon layer 123, a melt-blown non-woven fabric layer 124, and an antibacterial coating 125, the composite filter body 1 further comprises:

a third interlayer connection structure, the third interlayer connection structure being arranged between two adjacent layers in the main filter layer 12, and the third interlayer connection structure being used for fixing two adjacent layers in the main filter layer 12 together.

In this way, by providing the third interlayer connection structure between adjacent functional layers in the main filter layer 12, the filter media having different characteristics such as the glass fiber layer 121, the polyester fiber layer 122, the activated carbon layer 123, the melt-blown non-woven fabric layer 124, and the antibacterial coating 125 form a stable interlayer combination, thereby effectively preventing interface separation or structural deformation caused by physical characteristic differences during use of the multi-layer functional filter layer, ensuring that the functional filter layers always maintain a designed collaborative filtering relationship in the composite filter body 1, and at the same time, on the basis of maintaining the structural integrity of each component inside the main filter layer 12, the third inter-layer connection structure ensures the effective engagement of the functions such as pollutant interception, adsorption, and antibacterial between multiple layers of composite filter media, thereby significantly improving the overall structural stability and multifunctional collaborative filtering effect of the composite filter body 1.

In an embodiment, the first inter-layer connection structure, the second interlayer connection structure, and the third inter-layer connection structure may all be any one of a hot-melt connection structure, an adhesive bonding structure, and a suture connection structure. In this way, by configuring the first inter-layer connection structure, the second interlayer connection structure, and the third inter-layer connection structure to be capable of selectively using a hot-melt connection structure, an adhesive bonding structure, or a suture connection structure, the connection manner between the functional filter layers of the composite filter body 1 has process adaptation flexibility, wherein the hot-melt connection achieves a seamless interface bonding by means of self-bonding of materials, and can avoid glue pollution; the adhesive bonding can adapt to high-strength bonding requirements between different material layers; moreover, the suture connection provides a mechanical reinforcement-type reliable fixing; the selective application of the three connection modes can optimize the interlayer bonding strength for different functional filter layer material properties, and can also balance the connection efficiency and cost according to the production process, thereby ensuring that the composite filter body 1 maintains stable interlayer structural integrity under long-term airflow impact and temperature and humidity changes, thereby comprehensively improving the reliability and service life of the filter body.

In one embodiment, the cross-sectional shape of the composite filter body 1 is rectangular, that is, the composite filter body 1 is in the shape of a flat plate, so that the composite filter body 1 can be applied to an HVAC air filter screen and an air clean filter element.

In one embodiment, a cross-sectional shape of the composite filter body 1 is a continuously folded wavy shape, so that the composite filter body 1 can be applied to a HEPA filter or a high-volume air filter.

In one embodiment, a cross-sectional shape of the composite filter body 1 is a continuously folded zigzag shape, so that the composite filter body 1 can be applied to a HEPA filter or a high-volume air filter.

In one embodiment, the composite filter body 1 is cylindrical, so that the composite filter body 1 can be applied to an industrial dust removal filter element.

In one embodiment, the composite filter body 1 is in other irregular shapes, so that the composite filter body 1 can be applied to a vehicle-mounted air conditioner filter element, a mask filter element, and the like.

In summary, the composite filter body 1 of the present disclosure has at least the following advantages:

The filtration efficiency can reach G4-MERV 13 grade, PM2.5 filtration rate >85%, and PM0.3 efficiency can reach ≥95% by means of a composite design.

The wind resistance is lower than 300 Pa (under conventional wind speed conditions).

The antibacterial rate >99% (for *Escherichia coli, Staphylococcus aureus*, etc.).

Without integrating the glass fiber layer 121 and the polyester fiber layer 122, the whole material is degradable, environmentally friendly and non-toxic, and satisfies the requirements of RoHS and REACH regulations.

Referring to FIG. 4 to FIG. 9, a filter cartridge according to a preferred embodiment of the present disclosure is shown, including the above composite filter body 1.

According to the filter cartridge of the present utility model, since the composite filter body 1 is used, the problem of low filtration efficiency of a traditional single material is solved by means of the composite laminated structure of the bamboo fiber pre-filter layer 11 and the main filter layer 12, and is specifically expressed as: the bamboo fiber pre-filter layer 11 preferentially intercepts large particle pollutants by means of the natural porous network structure thereof, achieving coarse-effect filtering and reducing the load of the main filter layer 12.

The main filter layer 12 performs, by means of a synergistic effect of single or multiple mechanisms such as micron-scale fiber interleaving, activated carbon adsorption, melt-blown cloth electrostatic electret, etc. fine particles such as PM2.5 in the pre-filtered air are subjected to deep retention, and the two (the bamboo fiber pre-filter layer 11 and the main filter layer 12) cooperate at a decreasing level by means of an aperture gradient, so that the air pollutants sequentially undergo a step-type purification process of coarse filtration-fine filtration, and finally the filtration efficiency is improved.

In addition, a natural longitudinal tubular pore structure is provided inside the bamboo fiber, the surface of the fiber is distributed with irregular micron-sized grooves and holes, and the multi-stage pore size distribution enables a multi-channel shunting effect to be formed when air flows, thereby preventing the local pressure drop from being increased by means of a single path in the airflow set; at the same time, the rigidity of the bamboo fiber is moderate, the fiber naturally forms a three-dimensional mesh structure during processing, and the filter network is constructed by means of physical lapping instead of tightly entanglement, such an open architecture not only ensures the effective interception of large particle pollutants, but also avoids the rigid barrier of the traditional dense filter material on the airflow.

In addition, the hemicellulose components on the surface of the bamboo fiber have natural hydrophilicity, which can reduce the adhesion and accumulation of particulate matter on the surface of the fiber, prevent the dynamic wind resistance caused by particulate blockage during the filtering process, and synthesize the above structural characteristics, so that the pre-filter layer 11 of the bamboo fiber maintains a low and stable airflow resistance while achieving coarse-effect filtering, that is, the dual effect of improving filtration efficiency and wind resistance optimization can be achieved.

In addition, the bamboo fiber material itself has natural antibacterial and anti-mite properties.

In combination with the main filter layer 12, the antibacterial and mildew-proof ability of the composite filter body 1 can be enhanced, and the service life of the composite filter body 1 can be prolonged.

A preferred embodiment of the present disclosure provides an air filtration device, comprising the above composite filter body 1.

According to the air filtering device of the present utility model, since the composite filter body 1 is used, the problem of low filtration efficiency of a traditional single material is solved by means of the composite laminated structure of the bamboo fiber pre-filtering layer 11 and the main filtering layer 12, and is specifically expressed as: the bamboo fiber pre-filtering layer 11 preferentially intercepts large particle pollutants by means of the natural porous network structure thereof, achieving coarse-effect filtering and reducing the load of the main filtering layer 12.

The main filter layer 12 performs, by means of a synergistic effect of single or multiple mechanisms such as micron-scale fiber interleaving, activated carbon adsorption, melt-blown cloth electrostatic electret, etc. fine particles such as PM2.5 in the pre-filtered air are subjected to deep retention, and the two (the bamboo fiber pre-filter layer 11 and the main filter layer 12) cooperate at a decreasing level by means of an aperture gradient, so that the air pollutants sequentially undergo a step-type purification process of coarse filtration-fine filtration, and finally the filtration efficiency is improved.

In addition, a natural longitudinal tubular pore structure is provided inside the bamboo fiber, the surface of the fiber is distributed with irregular micron-sized grooves and holes, and the multi-stage pore size distribution enables a multi-channel shunting effect to be formed when air flows, thereby preventing the local pressure drop from being increased by means of a single path in the airflow set; at the same time, the rigidity of the bamboo fiber is moderate, the fiber naturally forms a three-dimensional mesh structure during processing, and the filter network is constructed by means of physical lapping instead of tightly entanglement, such an open architecture not only ensures the effective interception of large particle pollutants, but also avoids the rigid barrier of the traditional dense filter material on the airflow.

In addition, the hemicellulose components on the surface of the bamboo fiber have natural hydrophilicity, which can reduce the adhesion and accumulation of particulate matter on the surface of the fiber, prevent the dynamic wind resistance caused by particulate blockage during the filtering process, and synthesize the above structural characteristics, so that the pre-filter layer 11 of the bamboo fiber maintains a low and stable airflow resistance while achieving coarse-effect filtering, that is, the dual effect of improving filtration efficiency and wind resistance optimization can be achieved.

In addition, the bamboo fiber material itself has natural antibacterial and anti-mite properties.

In combination with the main filter layer 12, the antibacterial and mildew-proof ability of the composite filter body 1 can be enhanced, and the service life of the composite filter body 1 can be prolonged.

Reference throughout this specification to "an embodiment," "some embodiments," "an example," "a specific example," or "some examples," means that a particular feature, structure, material, or characteristic described in connection with the embodiment or example is included in at least one embodiment or example of the present application. Furthermore, the particular features, structures, materials, or characteristics described may be combined in any suitable manner in any one or more embodiments or examples.

In addition, different embodiments or examples and features of different embodiments or examples described in this specification can be combined and combined by those skilled in the art without contradicting each other.

In addition, the terms "first" and "second" are used for descriptive purposes only and cannot be understood as indicating or implying relative importance or implicitly indicating the number of indicated technical features. Thus, the features defined with "first" and "second" may explicitly or implicitly include at least one of the features. In the description of the present application, "a plurality of" means two or more, unless otherwise specifically defined.

The above are only some embodiments of the present application and are not intended to limit the patent scope of the present application. Any equivalent structural transformation made using the specification and drawings of the present application under the technical concept of the present application, or directly/indirectly applied in other related technical fields is included within the patent scope of the present application.

What is claimed is:

1. A composite filter body, comprising:
   a front filter layer, the front filter layer being a structure made of bamboo fiber material, and the front filter layer being used for pre-filtering air; and
   a main filter layer is stacked with the front filter layer, the main filter layer is communicated with the front filter layer, the main filter layer is one or a combination of multiple layers selected from a glass fiber layer, an activated carbon layer,
   a rear filter layer;
   the rear filter layer, the main filter layer, and the front filter layer are sequentially stacked in a thickness direction of the composite filter body, the rear filter layer is communicated with the main filter layer, the rear filter layer is a structure made of bamboo fiber material, and the rear filter layer is used for post-filtering the air processed by the main filter layer;
   a first interlayer connection structure provided between the front filter layer and the main filter layer, the first interlayer connection structure being used for fixing the front filter layer and the main filter layer together;
   the first interlayer connection structure can be a suture connection structure;
   a second interlayer connection structure is provided between the main filter layer and the rear filter layer, and the second interlayer connection structure is used for fixing the main filter layer and the rear filter layer together;
   the second interlayer connection structure can be any one of the following: a suture connection structure.

2. The composite filter body according to claim 1, wherein in a case of the main filter layer is a combination of multiple layers selected from a glass fiber layer, an activated carbon layer, the composite filter further comprises:
   a third interlayer connection structure is provided between two adjacent layers in the main filter layer, and the third interlayer connection structure is used for fixing two adjacent layers in the main filter layer together.

3. The composite filter body according to claim 2, wherein the third interlayer connection structure can be a suture connection structure.

* * * * *